June 3, 1930. J. H. DAVIS 1,761,710
AIRPLANE
Filed April 22, 1929  3 Sheets-Sheet 1

June 3, 1930. J. H. DAVIS 1,761,710
AIRPLANE
Filed April 22, 1929 3 Sheets-Sheet 3

INVENTOR.
John H. Davis
BY
ATTORNEYS

Patented June 3, 1930

1,761,710

UNITED STATES PATENT OFFICE

JOHN H. DAVIS, OF NEW YORK, N. Y., ASSIGNOR TO AIR LINE TRANSPORTATION COMPANY, OF PHILADELPHIA, PENNSYLVANIA, A CORPORATION OF DELAWARE.

AIRPLANE

Application filed April 22, 1929. Serial No. 357,035.

This invention provides a novel construction whereby an airplane is enabled to lift itself vertically in starting to sustain itself or "hover" when off the ground and to arrest or control its vertical descent when landing. This invention enables the airplane when starting to readily clear obstructions which otherwise it would not be able to clear because of the load it carries; and to start from or descend onto very small areas without shock or damage to the plane.

This invention is an improvement in airplanes and in particular is an improvement upon the airplane shown in my application for U. S. patent filed December 5, 1927, Serial No. 237,861 which has eventuated into Patent No. 1,721,772 dated July 23, 1929.

The accompanying drawings illustrate an embodiment of the invention as applied to an airplane, and I will describe the same with reference thereto, to enable others skilled in the art to adopt and use the invention; and summarize in the claims the essentials of the invention and novel features of construction and novel combinations of parts for all of which protection is desired.

Figure 1:
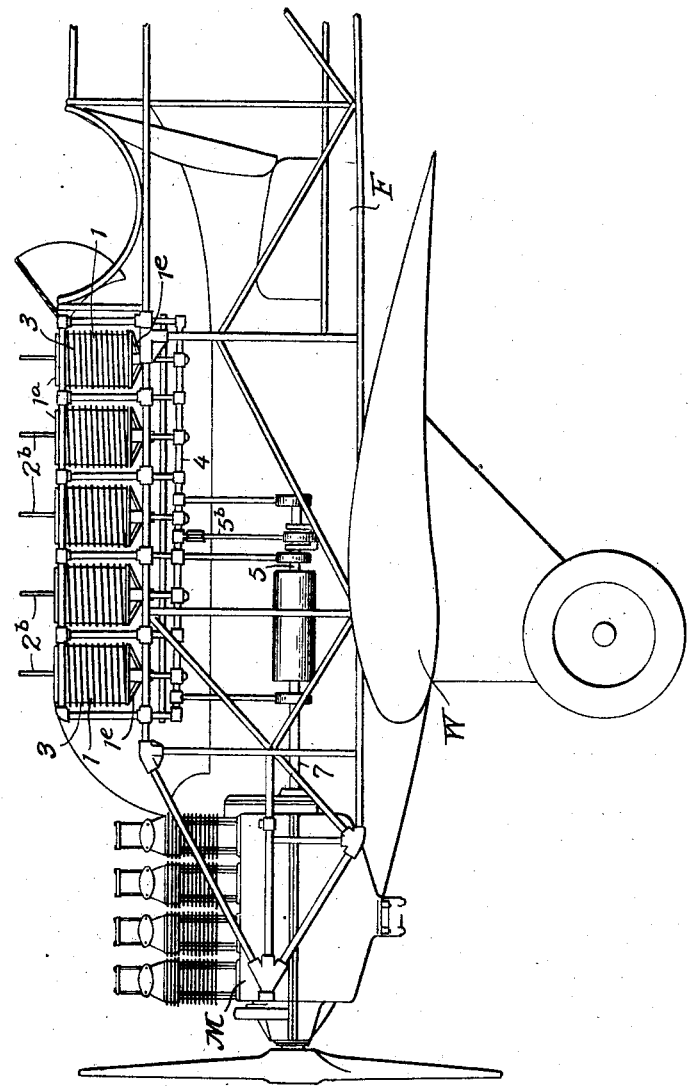
Fig. 1 is a side view of part of an airplane equipped with my invention.
Figure 2:
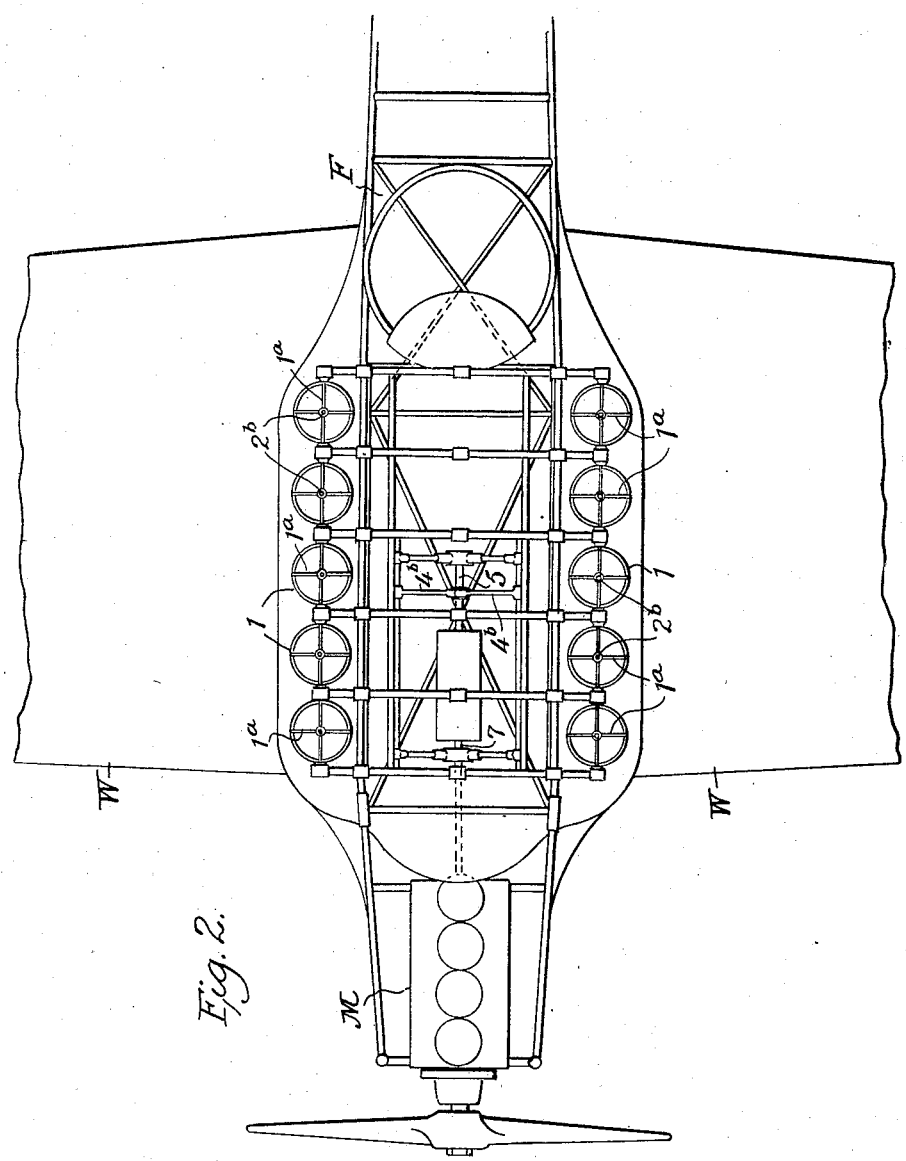
Fig. 2 is a top plan view of Fig. 1.
Figure 3:
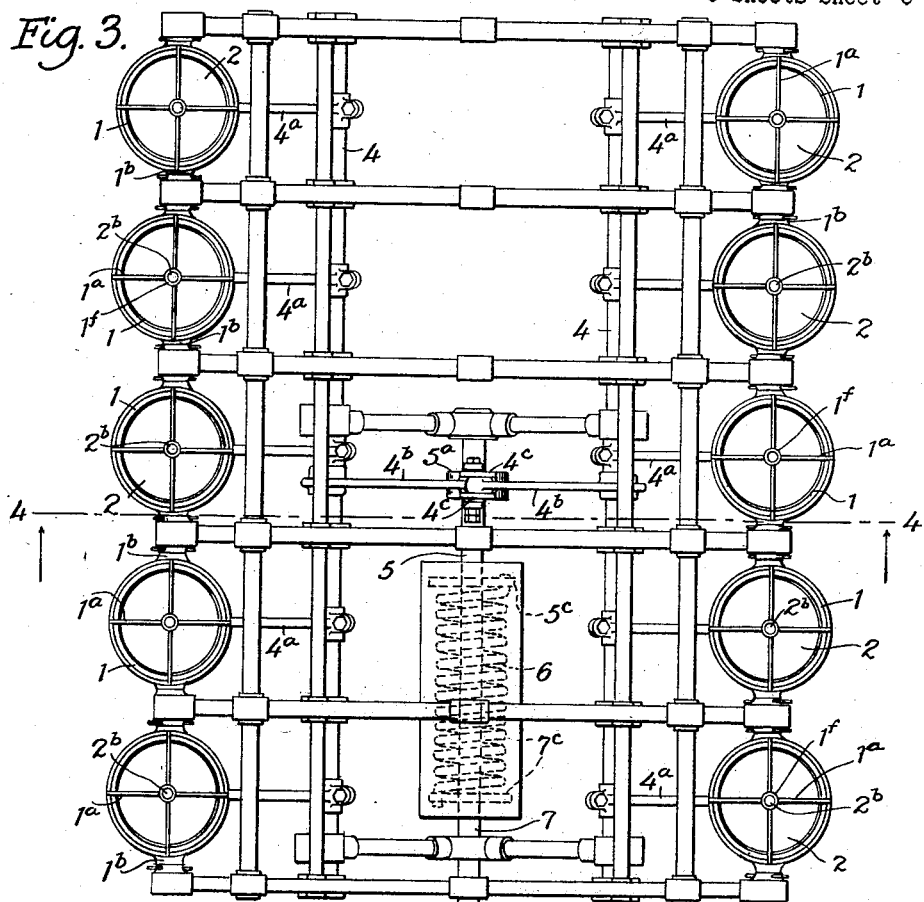
Fig 3 is an enlarged plan view of the system of beaters and their operative devices detached from the plane.
Figure 4:
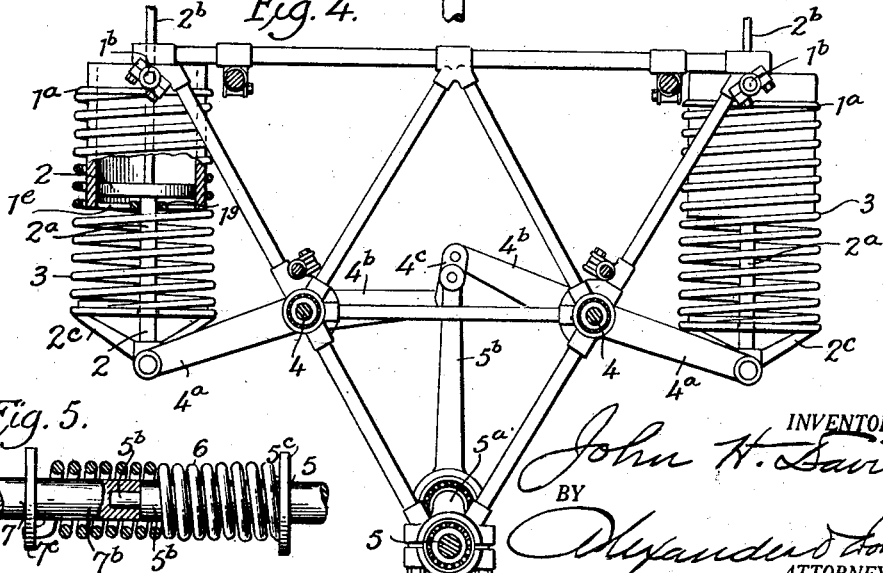
Fig. 4 is a section on the line 4—4 Fig. 3.
Figure 5:
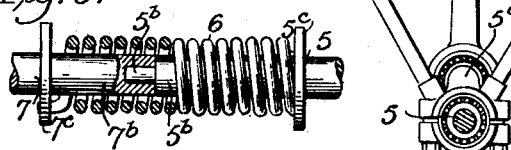
Fig. 5 is a detail of the spring connection between the driving and driven shafts.

The fuselage F can be of any desired type and if desired provided with wings W of any suitable kind. As shown the wings are mounted on the fuselage adjacent the front end thereof.

At each side of the fuselage adjacent the front thereof is a series of open-ended cylinders 1 which are preferably pivotally suspended at their upper ends on a suitable supporting frame, which may be an integral part of the fuselage framing or rigidly attached thereto. The frame is shown as made of tubular members but the particular construction of such frame forms no part of the present invention, and is not claimed herein, and therefore does not require any special description or illustration. The rows of cylinders 1 are preferably disposed on opposite sides of the fuselage, and longitudinally thereof, the cylinders being capable of slight lateral swinging movement.

The upper end of each cylinder is preferably provided with a spider $1^a$ having trunnions $1^b$ by which the cylinder is suspended on the frame, and said spider has an axially bored hub $1^f$.

In the lower end of the cylinder 1 may be secured a spider $1^e$ having an axially bored hub $1^g$.

Within each cylinder is an air beater or piston 2 which is attached to a rod $2^a$, the lower end of which rod is connected to the outer end of a swingable arm $4^a$ attached to a rock shaft 4. The piston should not actually contact with the walls of the cylinder and as far as possible all frictional resistance is to be avoided, and for this purpose the piston has an upper rod $2^b$ which passes through the guides $1^f$ and $1^g$ to keep the piston 2 centered in the cylinder and prevent it binding against the sides of the cylinder.

While the cylinders and pistons or air beaters are shown as cylindric, the invention is not restricted to any particular size or contour of cylinders and pistons.

On the lower end of the rod $2^a$ beneath the cylinder is a spider $2^c$, and supported on this spider is a helical expansion spring 3, which spring loosely embraces the cylinder and is much longer than the cylinder. The upper end of the spring bears against the spider $1^a$—and said spring will be compressed if the piston is raised in the cylinder.

The shaft 4 is journaled in suitable bearings in the framing and extends preferably parallel with the fuselage and row of cylinders. The rock shaft 4 may be operated to swing levers $4^a$ upward at proper time, by means of a lever $4^b$ which is connected by a shackle $4^c$ with the upper end of a link $5^b$ which is in turn connected to a crank $5^a$ on a shaft 5 which is suitably journaled in the framing. Therefore when the shaft 5 is rotated, a rocking motion will be imparted to the shaft 4, and arms 4ᵃ will cause the pistons 2 in the cylinders to be simultaneously raised and compress the springs.

The shaft 5 may be driven from a motor M of any suitable type. Preferably a yieldable spring connection is interposed between the motor driven shaft 7, and the crank shaft 5.

The split shaft 7 may have a section 7ᵇ on its end provided with an axial bore to receive an axial stud 5ᵇ on the adjacent end of shaft 5, so that the shafts 7 and 5 are kept in exact alignment. Strung upon and between the shaft sections 7ᵇ and 5ᵇ is a stout helical spring 6, one end of which is fast to a collar 5ᶜ on shaft 5, and the other end fast to a collar 7ᶜ on shaft 7. The strength of spring 6 is preferably made equal to or greater than the combined strength of all the springs 3; and at least so strong that when the shaft 7 is rotated in a direction to cause it through said connection to turn shaft 5ᵇ to raise pistons 2 in the cylinders 1 against the resistance of springs 3 the resistance of spring 6 will have to be overcome to enable shaft 5 to turn sufficiently to fully raise the pistons 2 and compress the springs 3; consequently in the lifting operation the spring 6 will be tensioned before springs 3 are fully tensioned by the raising of the beaters or pistons 2 in the cylinders; and therefore this will result in the shaft 5 lagging rotatorially behind the shaft 7 in such tensioning operation; for example, the shaft 7 may turn say 300 degrees before shaft 5 will have completed one-half revolution or rotated sufficiently to raise the pistons 2 to their uppermost position in the cylinders and put all of the springs 3 under full compression. This "lagging" of shaft 5 during compression of the springs 3 is important because it is essential that the air beaters or pistons 2 be lowered in the cylinders 1 with much greater velocity than they are raised; and this high velocity of descent of the pistons is effected by the expansion of the springs; while the raising of the pistons is effected by the action of the motor in compressing the springs as above described.

In practice the springs could be proportioned to move the air beaters downward at a rate of 352 feet per second. Assuming that the area of an air beater is 50 inches and it is moved downward at a velocity of 352 feet per second it should exert a lifting force or power equal to 312 lbs. per sq. ft. upon the plane.

To repeat, because of the flexible spring connection between the shafts 7 and 5; and the resistance of the springs 3 and 6 the shaft 5 will lag behind shaft 7 while compressing the springs but as soon as shaft 5 passes the dead center on the compression stroke, the springs 3 and 6 throw the beaters 2 downward instantaneously accelerating the movement of shaft 5, so that it is in position to resume the compression of the springs 6 and 3, at the end of the down strokes of the air beaters.

It may take 300 or more degrees of revolution of shaft 7 to cause shaft 5ᵃ to fully raise the air beaters and compress the springs but the springs snap the air beaters down with tremendous rapidity and complete the revolution of shaft 5. For example if the driving shaft 7 is operated at such speed as will cause shaft 5 to raise the beaters in one 20th of a second, the springs will depress the cylinders in one 720th of a second.

The rapid downward movement of the pistons exerts great lifting effect upon the fuselage, the lifting effect being proportioned to the surface areas of the pistons and speed of their descent. In the example shown there are five pistons in each row, one row on each side of the fuselage. These numbers might be increased or decreased. In the example shown the cylinders 1 should be 7 inches in diameter; the air-beaters or pistons 2, 6 63/64 inches in diameter; they are raised at a rate of about 20 feet per second, and lowered at the rate of 720 feet per second, therefore each piston or air beater 2 should exert a lifting force of approximately 800 pounds per square foot, or 200 pounds per piston, the area of each being ¼ of a square foot.

The construction described is such that the pistons are raised so slowly that they exert practically no back pressure or downward force on the fuselage;—and they are lowered at such great velocity as will cause them to exert a strong upward lift on the fuselage.

It is obvious that an airplane equipped with this invention would be able to be raised by the action of the air beaters or pistons substantially perpendicularly from the ground with greater or less speed; also to "hover" at any desired height above the ground; and can also be lowered slowly or practically perpendicularly to the earth; these capabilities being governed by the speed of operation or impulses of the air beaters or pistons per second of time; these capabilities enable the machine to be started from, or landed upon a very small field, or very restricted area.

The forward motion of the machine when in the air can be obtained by the usual propellers which may be driven from the motor in the usual manner.

I claim:

1. In an airplane, an air beater, a driving shaft and a connection between the driving shaft and the beater whereby more than 180 degrees of rotation of the driving shaft is required to move the beater on one stroke, and on the return stroke less than 180 degrees of movement of the driving shaft.

2. In an airplane, an air beater, springs for depressing the air beater, a driven shaft and connections for raising the beater, a driving shaft and connections between the driving and driven shaft whereby the driven shaft is turned more slowly than the driving shaft to compress the springs and raise the beaters, and is turned by the springs at a speed greatly in excess of the driving shaft during the descent of the beaters.

3. In an airplane, an air beater, means for raising the air beater, a driving shaft and a connection between the driving shaft and the means for raising the beater, whereby to move the beater on one stroke will require more than 180 degrees of rotation of the driving shaft, and on the return stroke less than 180 degrees of movement of the driving shaft.

4. In an airplane as set forth in claim 3, means for preventing lateral diffusion of the displaced air during the descent of the beaters.

5. In an airplane, a plurality of air beaters, means for raising the air beaters, spring means for lowering the beaters, a driving shaft, a connection between the driving shaft and the means for raising the beaters, whereby to raise the beaters and tension the spring means will require more than 180 degrees of rotation of the driving shaft, and the beater will be quickly depressed by the spring means during less than 180 degrees of movement of the driving shaft.

6. In an airplane as set forth in claim 5, means for preventing lateral diffusion of the displaced air during the descent of the beaters.

7. In an airplane, an air beater, a spring for depressing the beater with great velocity on one stroke, a driven shaft and connections for moving the beater relatively slowly to compress the spring during the return stroke of the beater; a driving shaft, a spring connection between the driving shaft and the driven shaft whereby the driven shaft will be moved more slowly than the driving shaft to compress the spring and tension the said spring connection during the greater part of a rotation of the driving shaft, and will be moved under the action of the spring, more quickly than the driving shaft during the remaining part of a rotation of the driving shaft.

8. In an airplane as set forth in claim 7, means for preventing lateral diffusion of the displaced air during the rapid stroke of the beater.

9. In an airplane, a plurality of air beaters, springs for rapidly moving the beaters in a direction to exert a lifting effect upon the plane, a driven shaft and connections for moving the beaters in the opposite direction, a driving shaft, a spring connection between the driving shaft and the driven shaft whereby the latter will turn more slowly than the driving shaft and compress the springs during more than 180 degrees of movement of the driving shaft; and under action of the springs the beaters will be caused to descend during less than 180 degrees of movement of the driving shaft.

10. In an airplane as set forth in claim 9, means for preventing lateral diffusion of the displaced air during the descent of the beaters.

11. For an airplane, a plurality of air beaters, springs for operating these air beaters with great rapidity on one stroke, a driven shaft and connections for moving the beaters more slowly on the opposite stroke; a driving shaft, a spring connecting the driving shaft with the driven shaft, whereby the driven shaft is turned more slowly than the driving shaft to compress the springs and raise the beaters, and is turned by the springs at a speed greatly in excess of the driving shaft during the descent of the beaters.

12. Airplane lifting means, comprising a cylinder, a piston therein, a rod for reciprocating the piston, a spring for depressing the piston; means for periodically raising the piston in the cylinder to compress the spring, a motor and a spring connection between the motor and the means for raising the piston, whereby more than 180 degrees of rotation of the driving shaft will be required to raise the piston but it will be lowered by the springs during less than 180 degrees of movement of the driving shaft.

13. Airplane lifting means, comprising a pivoted cylinder, a piston in the cylinder, a rod for reciprocating the piston, a spring for depressing the piston; a driven shaft and connections for raising the piston in the cylinder to compress the spring, a driving shaft, and a spring connection between the driving shaft and the driven shaft, whereby the driven shaft is turned more slowly than the driving shaft to raise the piston and compress the springs and is turned by the springs at a speed greatly in excess of the driving shaft during the descent of the piston.

14. Vertical lifting means for an airplane, comprising a plurality of vertically disposed open ended cylinders, a piston in each cylinder, a rod for reciprocating each piston expansion springs surrounding the cylinders and adapted to depress the pistons; a driven shaft and connections for moving the pistons upward and compressing the springs, a driving shaft, and a spring connection between the driving shaft and the driven shaft whereby the driven shaft will be moved more slowly than the driving shaft during more than 180 degrees of rotation of the driving shaft to raise the beaters and compress the springs, and will be moved more quickly than the driving shaft under the action of the springs during less than 180 degrees of movement of the driving shaft.

JOHN H. DAVIS.